(12) United States Patent
Wattenhofer et al.

(10) Patent No.: US 10,938,146 B2
(45) Date of Patent: Mar. 2, 2021

(54) DEVICE HOUSING FOR AN ELECTRICAL DEVICE

(71) Applicant: Siemens Schweiz AG, Zürich (CH)

(72) Inventors: Severin Wattenhofer, Meierskappel (CH); Hideki Ito, Walchwil (CH); Felix Schilter, Altdorf (CH)

(73) Assignee: SIEMENS SCHWEIZ AG, Zurich (CH)

( * ) Notice: Subject to any disclaimer, the term of this patent is extended or adjusted under 35 U.S.C. 154(b) by 0 days.

(21) Appl. No.: 16/609,926

(22) PCT Filed: May 3, 2018

(86) PCT No.: PCT/EP2018/061240
§ 371 (c)(1),
(2) Date: Oct. 31, 2019

(87) PCT Pub. No.: WO2018/202735
PCT Pub. Date: Nov. 8, 2018

(65) Prior Publication Data
US 2020/0220300 A1    Jul. 9, 2020

(30) Foreign Application Priority Data

May 5, 2017    (EP) .................................... 17169737

(51) Int. Cl.
*H01R 13/58*        (2006.01)
*H02G 3/14*         (2006.01)
(Continued)

(52) U.S. Cl.
CPC ........... *H01R 13/5804* (2013.01); *H02G 3/14* (2013.01); *H02G 15/007* (2013.01);
(Continued)

(58) Field of Classification Search
CPC ............ H01R 13/5804; H01R 13/5816; H01R 13/582; H01R 13/5825; H01R 13/5829; H01R 13/5812
See application file for complete search history.

(56) References Cited

U.S. PATENT DOCUMENTS 4,108,527 A * 8/1978 Douty .................. H01R 13/627
                                                         439/465
7,815,445 B2 * 10/2010 Wu ........................ H01R 9/032
                                                          439/99
(Continued)

FOREIGN PATENT DOCUMENTS

CN         102272493 A     12/2011    ............... F16J 15/02
CN         102918721 A     2/2013     ............. H01R 13/74
(Continued)

OTHER PUBLICATIONS

Search Report for International Application No. PCT/EP2018/061240, 11 pages, dated Jun. 29, 2018.

*Primary Examiner* — Renee S Luebke
*Assistant Examiner* — Paul D Baillargeon
(74) *Attorney, Agent, or Firm* — Slayden Grubert Beard PLLC

(57) ABSTRACT

Various embodiments include device housing for an electrical device comprising: an inner housing with a first lower shell and a first upper shell; and an outer housing with a second lower shell and a second upper shell. There is a cable insertion opening defined by a cable seating profile in the first lower shell and a flush cable cover profile in the first upper shell for a cable routed to the device; a clamping body retained by the inner housing; and a friction and/or form-fitting contact between the clamping body and the cable can be effected by means of the outer housing when the clamping body is pressed onto an outer surface of the cable by the upper shell of the outer housing.

9 Claims, 8 Drawing Sheets

(51) Int. Cl.
*H02G 15/007* (2006.01)
*H02G 3/08* (2006.01)

(52) U.S. Cl.
CPC ........ *H01R 13/582* (2013.01); *H01R 13/5816* (2013.01); *H01R 13/5825* (2013.01); *H02G 3/083* (2013.01)

(56) References Cited

U.S. PATENT DOCUMENTS

| | | | |
|---|---|---|---|
| 8,951,062 B2* | 2/2015 | Fleischmann | ........ H01R 13/585 |
| | | | 439/465 |
| 8,979,580 B2 | 3/2015 | Bitzer | ........................... 439/560 |
| 9,764,651 B2 | 9/2017 | Moon | |
| 10,658,786 B2* | 5/2020 | Refai | ................... H01R 13/582 |
| 2007/0037450 A1* | 2/2007 | Wu | ................... H01R 13/6335 |
| | | | 439/607.44 |
| 2008/0096417 A1* | 4/2008 | Boeck | ............... H01R 13/5837 |
| | | | 439/445 |
| 2013/0026161 A1 | 1/2013 | Sunsoku et al. | ............... 220/3.8 |
| 2016/0365712 A1 | 12/2016 | Burns | ......................... 174/50.5 |

FOREIGN PATENT DOCUMENTS

| | | | |
|---|---|---|---|
| CN | 104221236 A | 12/2014 | ................ F16L 5/14 |
| CN | 104701925 A | 6/2015 | ............. H02G 38/08 |
| DE | 42 17 906 A1 | 12/1993 | ................ H02G 3/18 |
| DE | 29911305 U1 | 11/1999 | ........... H02G 15/013 |
| DE | 20 2012 10163 U1 | 8/2013 | ................ H02G 3/18 |
| EP | 0 543 173 A1 | 5/1993 | ........... H02G 15/076 |
| GB | 2474931 A | 5/2011 | ............. H01R 13/52 |

* cited by examiner

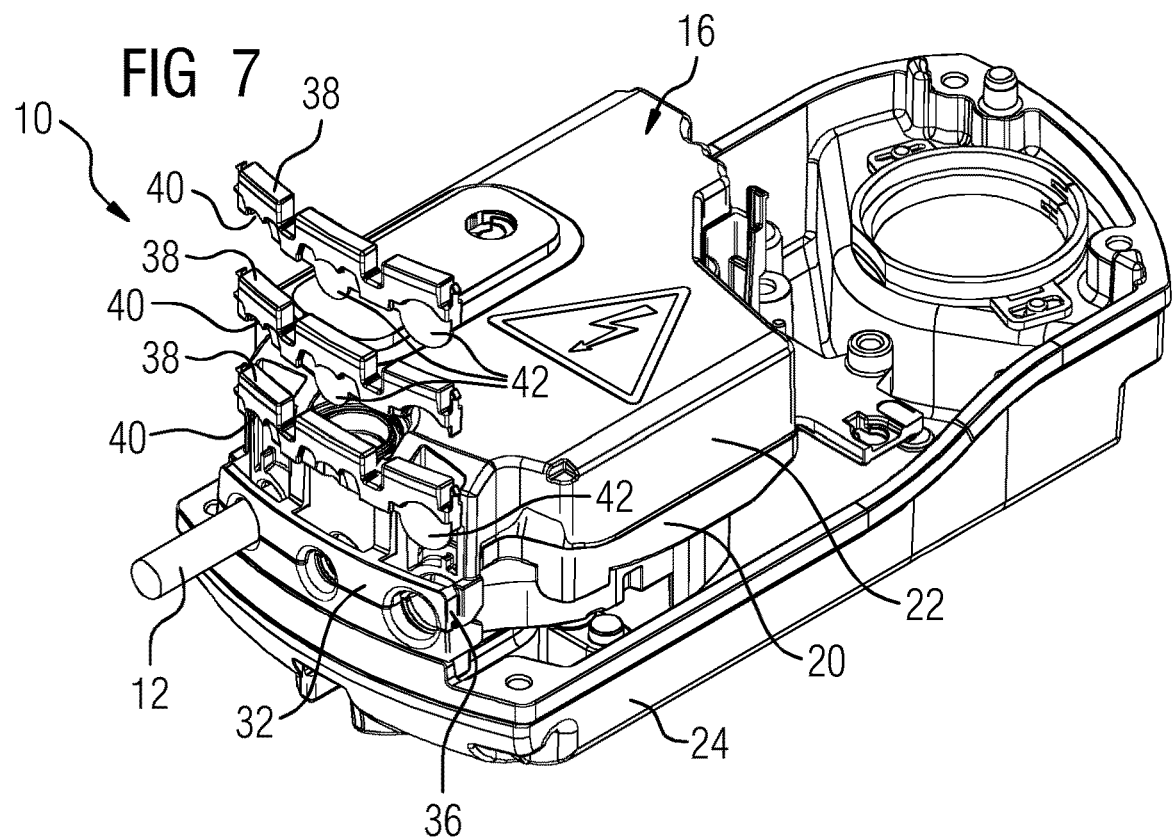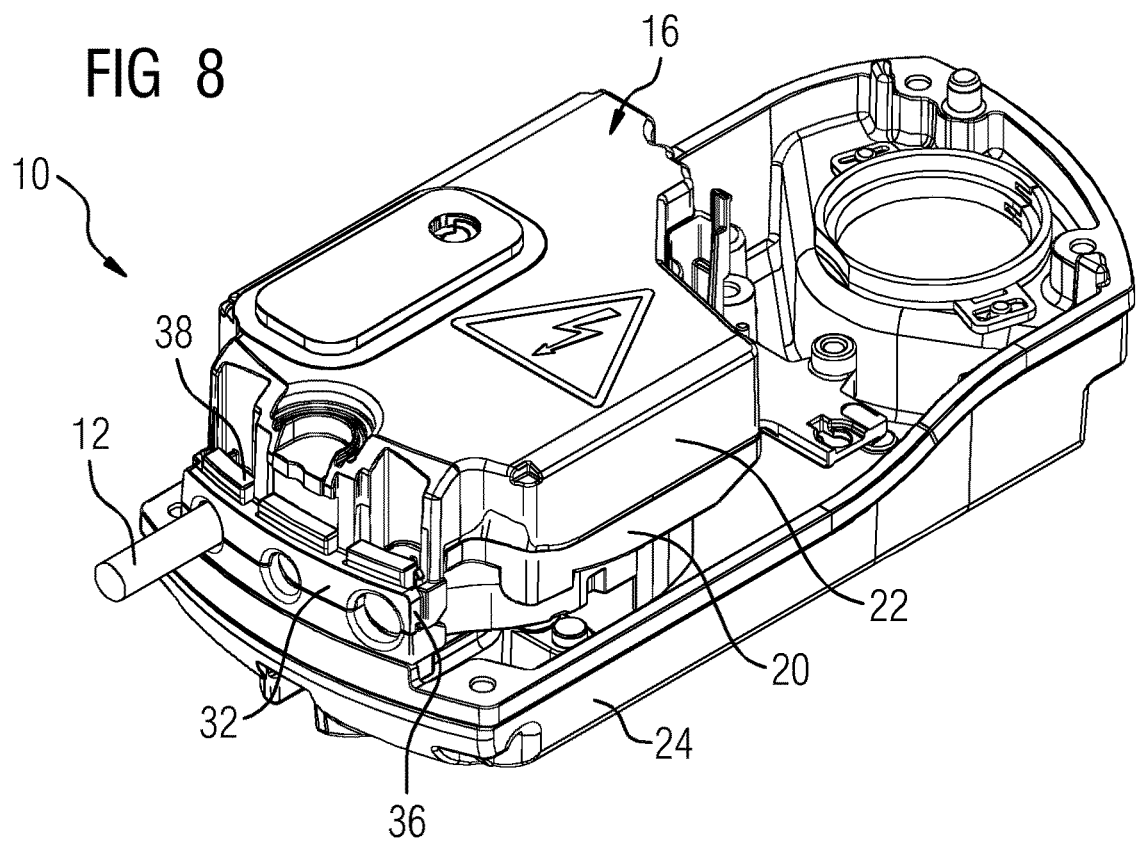

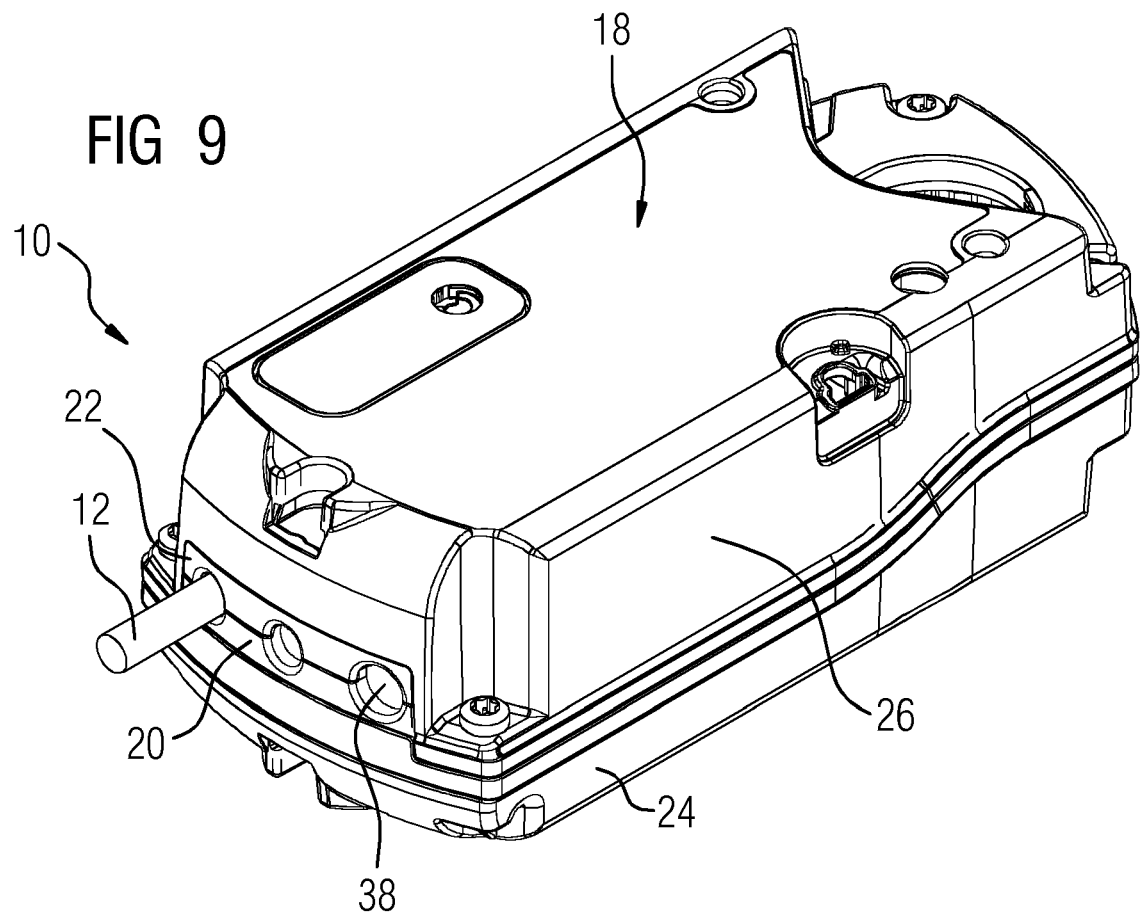

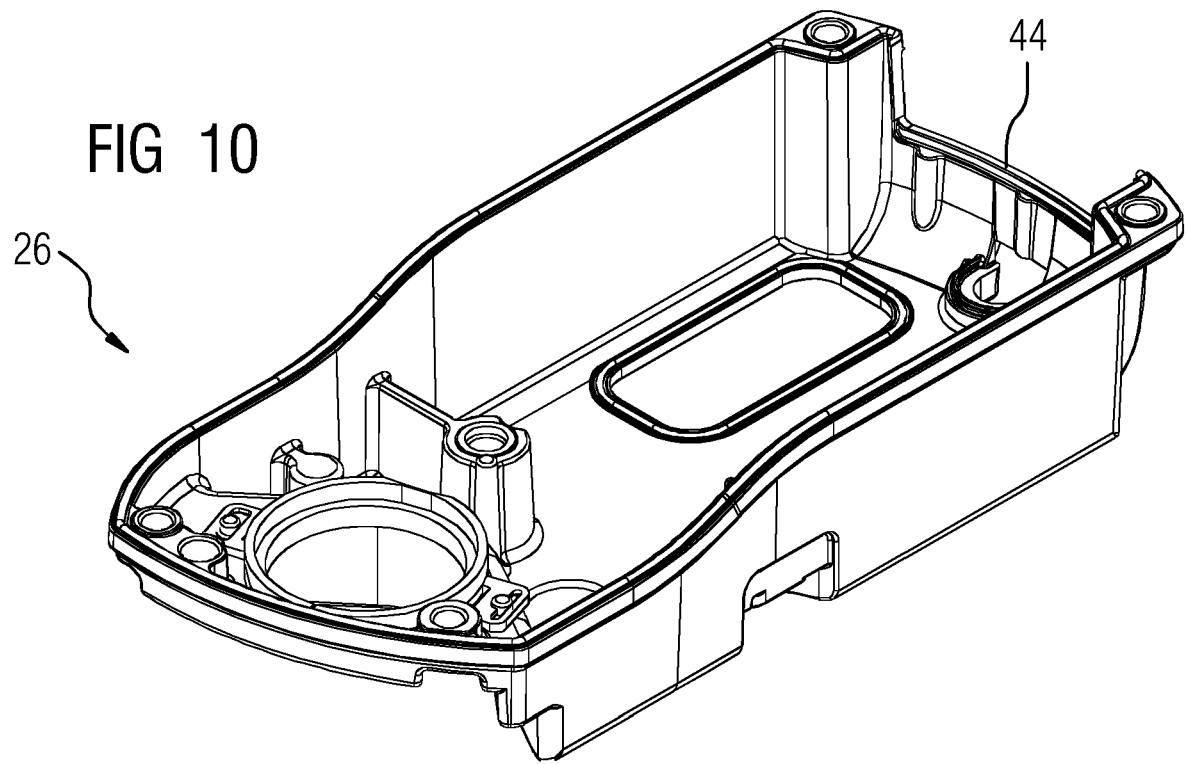

DEVICE HOUSING FOR AN ELECTRICAL DEVICE

CROSS-REFERENCE TO RELATED APPLICATIONS

This application is a U.S. National Stage Application of International Application No. PCT/EP2018/061240 filed May 3, 2018, which designates the United States of America, and claims priority to DE Application No. 17169737.8 filed May 5, 2017, the contents of which are hereby incorporated by reference in their entirety.

BACKGROUND

The present disclosure relates to electrical devices. Various embodiments may include device housings for electrical devices, methods for using such a device housing, and/or systems with such a device housing.

BACKGROUND

To avoid transmission of mechanical forces to a contact pad of a device along a cable routed to the device a strain relief is frequently provided. A very wide variety of strain relief means have long been familiar. One example that can be mentioned is the cable clip.

A bushing housing for one or multiple cables is described in German utility model DE 20 2012 101 639 U1. That bushing housing comprises a housing lower part, which is designed for arrangement on a housing, and a housing upper part, which can be brought from an open status, in which it is not fastened to the housing lower part, into a closed status, in which it is fixed onto the housing lower part and covers and in particular seals the latter. At least in the housing lower part at least one cable bushing seal is provided to accommodate an in particular pre-assembled cable. The bushing housing comprises a strain relief for the cable, wherein one or multiple fixing means for the attaching of the housing lower part on an electrical assembly in an interior of the bushing housing are provided. The housing lower part of the bushing housing is arranged in a stationary manner on a housing of the electrical assembly.

Robust, weatherproof housings for the protection of low-voltage and signal cables (and their connections) are described in US patent application US 2016/0365712 A1, which are provided for attachment to an external surface of a building, for example a residential dwelling. The interior of the housing is divided into at least two internal volumes, and access to a first of these volumes is restricted by a locking mechanism. Instead of a key lock the closure mechanism can be embodied with proprietary electrical data connection components.

A cable insertion grommet for the insertion of a cable into a housing or similar is described in German published patent application DE 42 17 906 A1. The insertion grommet has a grommet body, which is essentially pierced centrally by an opening. A strain relief is molded as an integral element on the grommet body over the opening, on which sealing lips can be provided. The strain relief retains the respective cable routed through the cable insertion grommet by means of a force acting essentially vertically to the surface of the cable. Such a cable insertion grommet can be used for connection and distribution boxes, in particular for telecommunications cable.

A distribution box for telecommunications cable is described in European patent application EP 0 543 173 A1. It comprises a housing lower part and cover cap and cable insertions arranged in the base area of the housing lower part. The cable insertions in each case have two folding sealing/clamping jaws for inlaying a cable with seal halves and clamps arranged one after the other in the longitudinal direction of the cable. The two folded sealing/clamping jaws, forming a sealing/clamping unit with at least one sealing gasket and a clamp for the cable concerned, can be inserted into a holder on the housing lower part from the front. On the one hand perfect cable sealing, and on the other hand cable clamping are thereby achieved, in particular allowing cables to be swung into or laid in the distribution box easily from the front in the course of the installation.

SUMMARY

One disadvantage of known strain relief devices is that these are frequently awkward to operate. The teachings of the present disclosure describe a strain relief which is particularly simple to operate. For example, some embodiments include a device housing (14) for an electrical device (10), wherein the device housing (14) comprises an inner housing (16) with a lower shell of the inner housing (20) and an upper shell of the inner housing (22) and an outer housing (18) with a lower shell of the outer housing (24) and an upper shell of the outer housing (26), wherein at least one cable seating profile (30) in the lower shell of the inner housing (20) and a flush cable cover profile (34) in the upper shell of the inner housing (22) form a cable insertion opening (30, 34) for a cable (12) which can be routed to the device (10), wherein the inner housing (16) retains a clamping body (38), and wherein a friction and/or form-fitting contact between the clamping body (38) and a cable (12) routed to the device (10) can be effected by means of the outer housing (18), by the clamping body (38) being pressable onto an outer surface of the cable (12) by means of the upper shell of the outer housing (26).

In some embodiments, a frame (36) of the upper shell of the inner housing (22) surrounds an area on an edge of the lower shell of the inner housing (20) with the or each cable seating profile (30) and the inner housing (16) retains the clamping body (38) by means of the frame (36) of the upper shell of the inner housing (22) and of the edge of the lower shell of the inner housing (20).

In some embodiments, the frame (36) comprises a collar (32) connected on one level to the upper shell of the inner housing (22).

In some embodiments, the frame (36) flush with the or each cable cover profile (34) of the upper shell of the inner housing (22) has a corresponding recess belonging to the cable cover profile (34).

In some embodiments, there is a multiplicity of cable insertion openings (30, 34), wherein multiple cables (12) inserted into one cable insertion opening (30, 34) in each case can be fixed by means of exactly one clamping body (38).

In some embodiments, there is a clamping body (38) made of an elastically compressible material, wherein the clamping body (38) is compressible by means of the outer housing (18) and upon friction-fitting contact between the clamping body (38) and the or each cable (12) routed to the device (10) can be effected.

In some embodiments, there is a form- and/or friction-fitting profile (46) facing the surface of a cable (12) routed to the device (10), wherein the form- and/or friction-fitting profile (46) of the clamping body (38) is pressed into the cable surface by means of the outer housing (18) and the form- and/or friction contact between the clamping body (38) and the or each cable (12) routed to the device (10) can be effected.

In some embodiments, the compression of the clamping body (38) or the pressing of the form- and/or friction-fitting profile (46) of the clamping body (38) by means of a locating surface (44) of the upper shell of the outer housing (26) can be effected, which upon connection of the upper shell of the outer housing (26) to the lower shell of the outer housing (24) comes into contact with a free surface of a clamping body (38) held in the frame (36).

As another example, some embodiments include a system with a device housing (14) as described above and a clamping body (38) which can be used with the device housing (14), wherein the clamping body (38) has a number of clamping body recesses (40) corresponding to the number of cables (12) to be routed to the device (10) and a number of clamping body blanking covers (42) corresponding to the number of cable insertion openings (30, 34) of the device housing (14) minus the number of cables (12) to be routed to the device (10).

In some embodiments, there is a multiplicity of clamping bodies (38) with in each case a different number of clamping body recesses (40) and clamping body blanking covers (42) and/or clamping body recesses (40) and clamping body blanking covers (42) at different points.

As another example, some embodiments include a method for using a device housing (14) as described above, wherein to obtain the inner housing (16) the upper shell of the inner housing (22) is connected to the lower shell of the inner housing (20), wherein at least one cable (12) is inserted into a cable insertion opening (30, 34) formed by the lower shell of the inner housing (20) and the upper shell of the inner housing (22) or is positioned in a cable seating profile (30) of the lower shell of the inner housing (20), the clamping body (38) is attached to the inner housing (16), and a friction and or form-fitted contact between the clamping body (38) and the or each cable (12) is effected by means of the outer housing (18), by the clamping body (38) being pressed onto an outer surface of the cable (12) by means of the upper shell of the outer housing (26).

In some embodiments, the clamping body (38) is attached to the inner housing (16), in that this is inserted into the frame (36) of the upper shell of the inner housing (22).

BRIEF DESCRIPTION OF THE DRAWINGS

An exemplary embodiment of the teachings herein is described in greater detail below on the basis of the drawing. Items or elements corresponding to each other are provided with the same reference characters in all figures, wherein:

FIGS. 3-9 show snapshots during assembly of the device housing and during connection of a cable to the electrical device;

FIG. 10 shows the upper shell of the outer housing of the device housing; and

DETAILED DESCRIPTION

Figure 1:
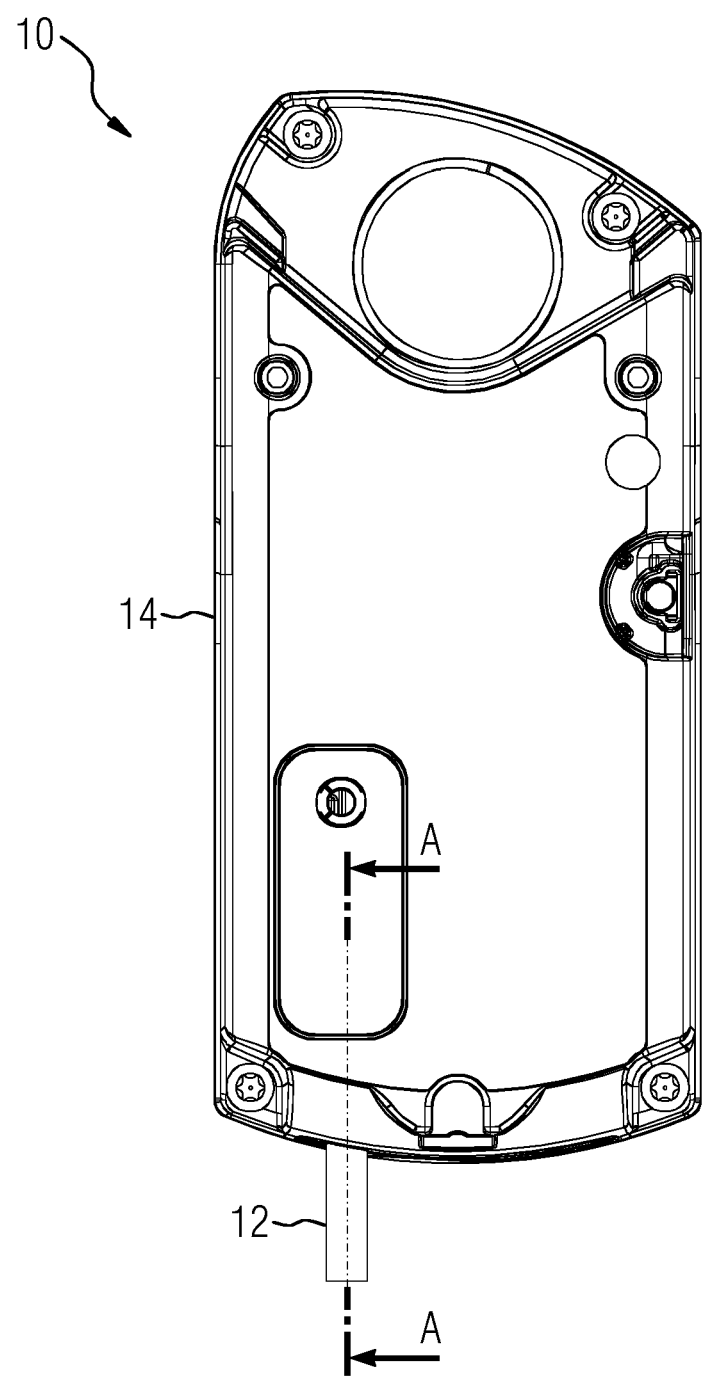
FIG. 1 shows a device housing of an electrical device incorporating teachings of the present disclosure.

The teachings of the present disclosure include a device housing with a multipart housing and at least one inner housing and an outer housing surrounding the inner housing. The inner housing and the outer housing are themselves in each case at least two-part in nature. Accordingly, the inner housing comprises a lower shell of the inner housing and an upper shell of the inner housing and the outer housing comprises a lower shell of the outer housing and an upper shell of the outer housing. The lower shell of the inner housing and the upper shell of the inner housing together form at least one cable insertion opening for a cable which can be routed to the device.

The or each cable insertion opening comprises a cable seating profile in the lower shell of the inner housing and a flush cable cover profile in the upper shell of the inner housing. The inner housing retains a clamping body intended for fixing the or each cable routed to the device. This is brought into friction and/or form-fitting contact with the or each such cable by means of the outer housing. The device housing is characterized in that by means of the outer housing a friction and/or form-fitting contact between the clamping body and a cable routed to the device can be effected. This friction and/or form-fitting contact between the clamping body and the or each cable routed to the device effects the strain relief.

In one method for using such a device housing or a device housing with additional, basically optional features according to the description which follows, to retain the inner housing the upper shell of the inner housing is initially connected to the lower shell of the inner housing. The connection can for example take place by means of a latching connection of the upper shell of the inner housing to the lower shell of the inner housing and/or screwing the upper shell of the inner housing to the lower shell of the inner housing. The inner housing encloses a circuit, for example a circuit on a pcb, or similar. The circuit determines the function of the device.

Individual wires of the or each cable routed to the device are connected to contact pads provided for them, for example contact pads on a pcb. The connection may take place in several manners, for example by means of soldering or through connection to a clamp or similar. Depending on whether the inner housing completely surrounds the circuit or not, such a connection takes place before closure of the inner housing or after closure of the inner housing.

Accordingly, the or each respective cable is positioned in the or a cable seating profile of the lower shell of the inner housing before the closure of the inner housing or after the closure of the inner housing, or a cable is inserted into the or a cable insertion opening formed by the lower shell of the inner housing and the upper shell of the inner housing. After connection of the upper shell of the inner housing to the lower shell of the inner housing the clamping body is attached to the inner housing thus created, and a friction and/or form-fitting contact is effected between the clamping body retained by the inner housing and the or each cable by means of the outer housing. The friction and/or form-fitting contact fixes the or each cable relative to the device housing and the fixing thus effected acts as strain relief, in that a tensile force exerted outside the device housing on the cable or a cable is transmitted to the device housing, that is to the device housing alone, and thus does not reach the or each contact pad in the interior of the device housing.

For the avoidance of unnecessary repetitions as regards the further description it is the case that features and details which are explained in connection with the cited method for using a device housing of the type described here and hereinafter, of course also apply in connection with and with regard to the device housing itself and vice versa. Accordingly, the methods can also be developed by means of individual or multiple method characteristics relating to method steps executed with and/or on the device housing and its parts, and the device housings are also developed by means for executing such method steps. Consequently features and details which are described in connection with the cited method and possible embodiments, of course apply in connection and with respect to the device housing itself and in each case vice versa, so that as regards disclosure reciprocal reference is always or can always be made to the individual embodiments.

Until manufacture of the outer housing through the connection of the upper shell of the outer housing to the lower shell of the outer housing, no forces are exerted on the device housing due to the strain relief. The connection of the device and especially also the maneuvering of the or each cable here routed to the device can take place uninfluenced by an otherwise frequently necessary advance fixing of the cable. This facilitates the connection of the device. The strain relief ultimately comes about in a particularly simple manner by means of the outer housing, in that its at least two parts are connected to each other, in particular by the upper shell of the outer housing being connected to the lower shell of the outer housing.

In some embodiments, a device housing includes a frame of the upper shell of the inner housing surrounding an area on one edge of the lower shell of the inner housing, namely the area with the or each cable seating profile. The inner housing then retains the clamping body by means of the frame of the upper shell of the inner housing and of the edge of the lower shell of the inner housing. The clamping body can here be positioned in a particularly simple manner. The frame forms seating for the clamping body, into which this is inserted. The frame holds the inserted clamping body in position, until the friction and/or form-fitting contact with the or each cable routed to the device, which acts as strain relief, is created by means of the outer housing.

In some embodiments, the frame comprises a collar connected on one level to the upper shell of the inner housing. This facilitates manufacture. Such an upper shell of the inner housing with a frame extending from it can for example be manufactured as an injection molded part, in particular a plastic injection molded part, in an injection molding procedure.

In some embodiments, the frame, in particular its collar, has a corresponding recess flush with the or each cable cover profile of the upper shell of the inner housing and belonging to the cable cover profile. With a clamping body inserted into the frame, the inner face of the frame facing the clamping body thus has a maximum surface area. The clamping body can rest upon this and in the case of a pulling force exerted on a cable, this surface takes up the tensile force.

In some embodiments, there are multiple cable insertion openings, wherein multiple cables inserted into one cable insertion opening in each case can be fixed by means of exactly one clamping body. Consequently, to obtain a strain relief for multiple cables exactly one clamping body only need to be attached. This too greatly simplifies the connection of the device.

In some embodiments, a clamping body made of an elastically compressible material is used, wherein the clamping body is compressible by means of the outer housing and upon compression the friction contact between the clamping body and the or each cable routed to the device can be effected. A particularly resilient friction connection between the clamping body and the or each cable can be created by means of such an elastically compressible clamping body. The retention force effected by means of the friction fitting can be set by the degree of compressibility of the clamping body.

In some embodiments, a clamping body is used which has on its "underside" facing the upper or lateral surface of a cable routed to the device a form- and/or friction-fitted profile functioning as a blade. By means of the outer housing such a form- and/or friction-fitted profile, referred to hereinafter for the sake of brevity as a blade, of the clamping body is pressed into the cable surface or in the case of multiple cables into their surfaces, wherein the or each cable is compressed, so that at least a form-fitting contact, routinely a form- and friction-fitting contact, between the clamping body and the or each cable routed to the device ensues.

In some embodiments, the compression of the clamping body and/or the compression of the or each cable can be effected by means of a locating surface of the upper shell of the outer housing, which upon connection of the upper shell of the outer housing to the lower shell of the outer housing comes into contact with a free surface of a clamping body held in the frame. By means of such a locating surface pressure can be exerted on the clamping body in a particularly efficient manner, and the pressure exerted is distributed evenly over the clamping body and evenly transmitted to this and the or each cable.

In some embodiments, a system includes a device housing of the type described here and hereinafter and with a clamping body which can be used with the device housing, wherein the clamping body has a number of clamping body recesses and clamping body blanking covers. The number of the clamping body recesses and clamping body blanking covers is derived from the number of cables to be routed to the device and the number of the cable insertion openings of the device housing. The clamping body comprises one clamping body recess for each cable to be routed to the device or to be connected to the device and one clamping body blanking cover for each cable insertion opening remaining free. Together with such a clamping body the device housing forms a clamping and sealing unit for fixing the or each cable (cable fixation) and for sealing in the area of a cable insertion in an electrical device.

In some embodiments, there are a multiplicity of clamping bodies in each case with a different number of clamping body recesses and clamping body blanking covers and/or clamping body recesses and clamping body blanking covers at different locations. A suitable clamping body for the particular use case or the most suitable for the particular use case can then be selected from the multiplicity of clamping bodies and used together with the device housing, for example in that the clamping body is attached to the inner housing within the framework of a special embodiment of the method cited in the preamble, with this being inserted into the frame of the upper shell of the inner housing.

The exemplary embodiment described below is not to be understood as a limitation of the scope of the disclosure.

Rather, within the framework of the present disclosure additions and modifications are entirely possible, in particular such as for example can be derived by the person skilled in the art with respect to the solution of the problem through the combination or changing of individual features or method steps described in conjunction with the general or particular description section and contained in the claims and/or the drawing, and lead to a new object or to new method steps or sequences of method steps through combinable features.

The representation in FIG. 1 shows a top view of an electrical device 10. The electrical device 10 shown functions as an actuating drive for ventilation flaps. This is however only an example. The innovations proposed here is independent of the function of the respective device 10. At least one cable 12 is connected to the device 10. This functions for example as a supply cable for feeding electrical energy to the device 10. In some embodiments, data or signals can be transmitted to the device 10 by means of the cable 12 or a further cable 12 or further cables 12 in a manner in principle known per se, or data and/or signals generated by the device 10 can be transmitted to other devices 10, sensors and/or actors in a technical process and/or to one or multiple higher-ranking units.

Figure 2:
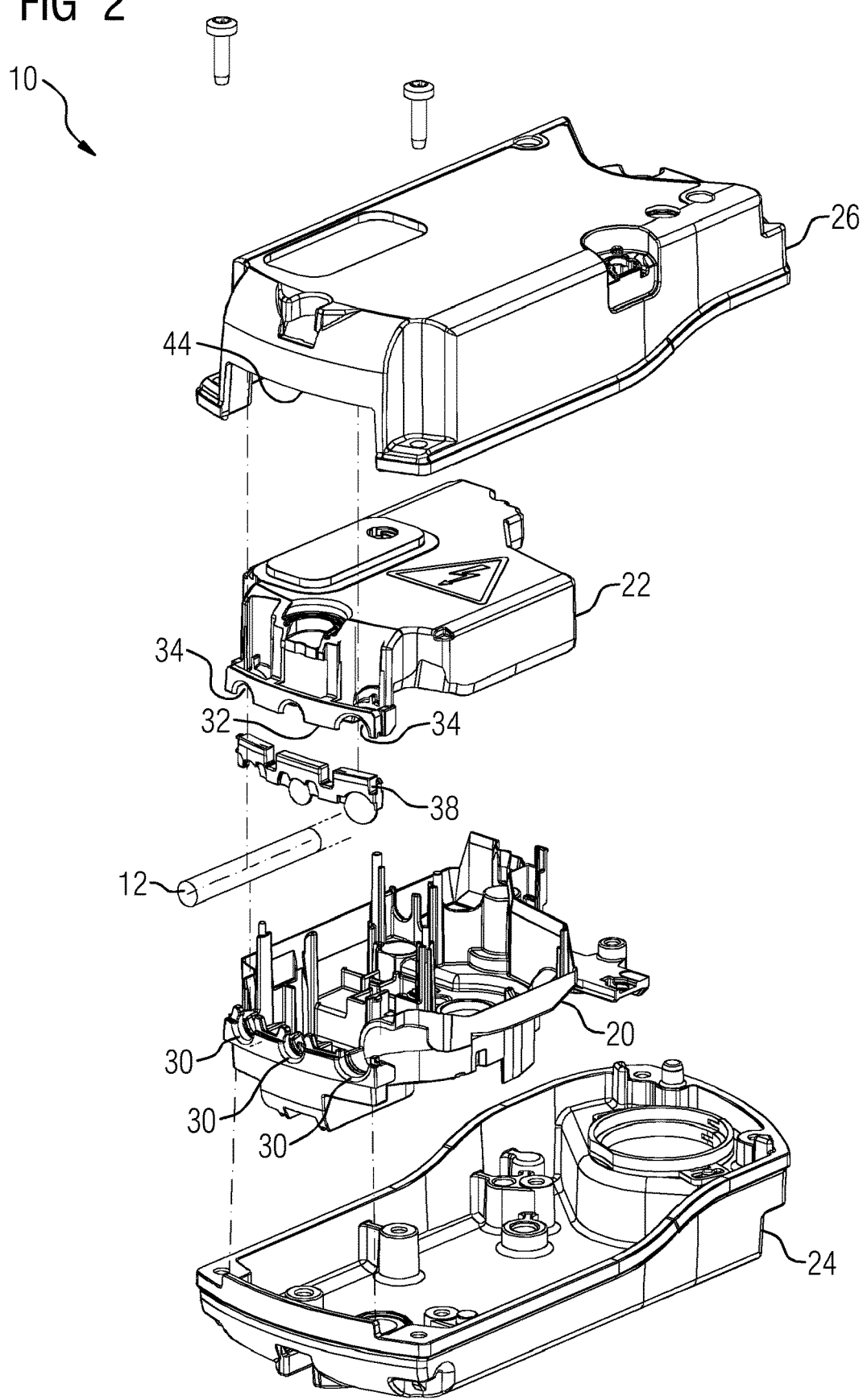
FIG. 2 shows the device housing according to FIG. 1 in an exploded representation, wherein it can be seen that the device housing is in two parts and comprises an inner housing with a lower shell of the inner housing and an upper shell of the inner housing and an outer housing with a lower shell of the outer housing and an upper shell of the outer housing.

The device 10 comprises a multipart device housing 14. The parts of the device housing 14 are shown in the representation in FIG. 2. The representation in FIG. 2 is an exploded representation of the device 10 according to FIG. 1, although without a circuit, pcb, or similar in the interior of the device housing 14. The device housing 14 comprises an inner housing 16 and an outer housing 18. The inner housing 16 is particularly apparent in the representation in FIG. 6 and FIG. 8. The outer housing 18 can be seen in the representation in FIG. 1 and otherwise especially in the representation in FIG. 10. The inner housing 16 and the outer housing 18 are themselves embodied in multipart form. In the embodiment represented the inner housing 16 comprises a lower shell and an upper shell (lower shell of the inner housing 20; upper shell of the inner housing 22). In the embodiment represented the outer housing 18 likewise comprises a lower shell and an upper shell (lower shell of the outer housing 24; upper shell of the outer housing 26).

The representations in FIG. 3 to FIG. 10 show the course of a cable fixation and sealing in the area of a cable insertion for an electrical device 10 according to the approach proposed here. The representations in FIG. 3 to FIG. 10 in each case show only a part of the device housing 14 and the housing parts 20, 22; 24, 26 included therein which are involved in the cable fixation and sealing.

Figure 3:
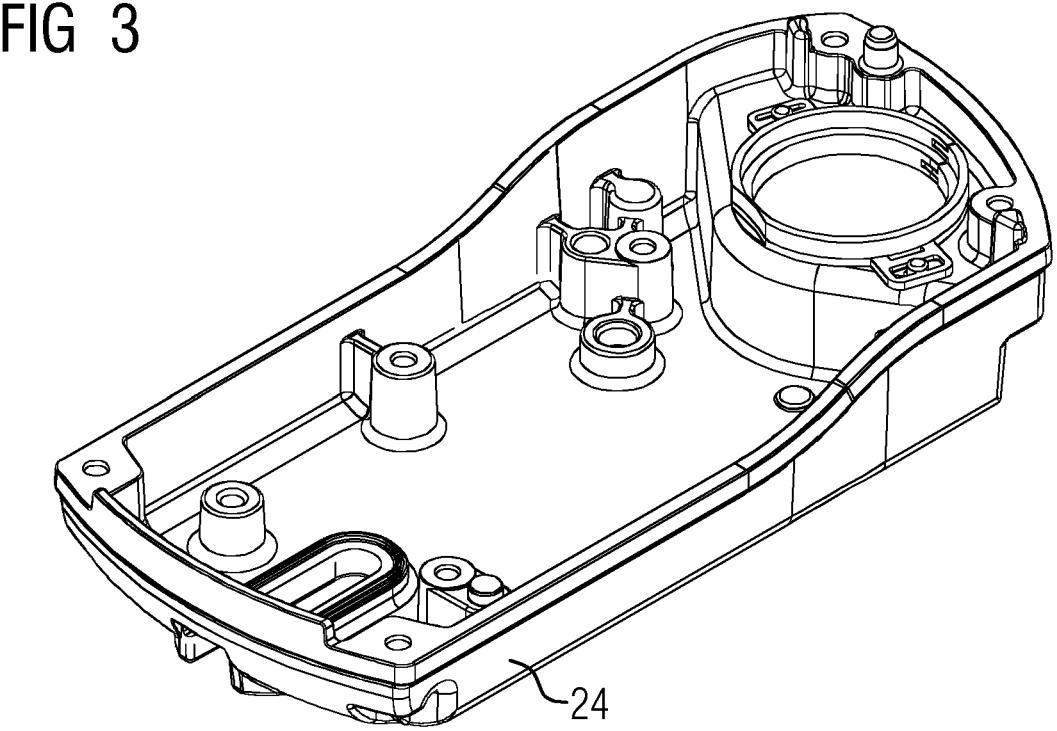
Figure 4:
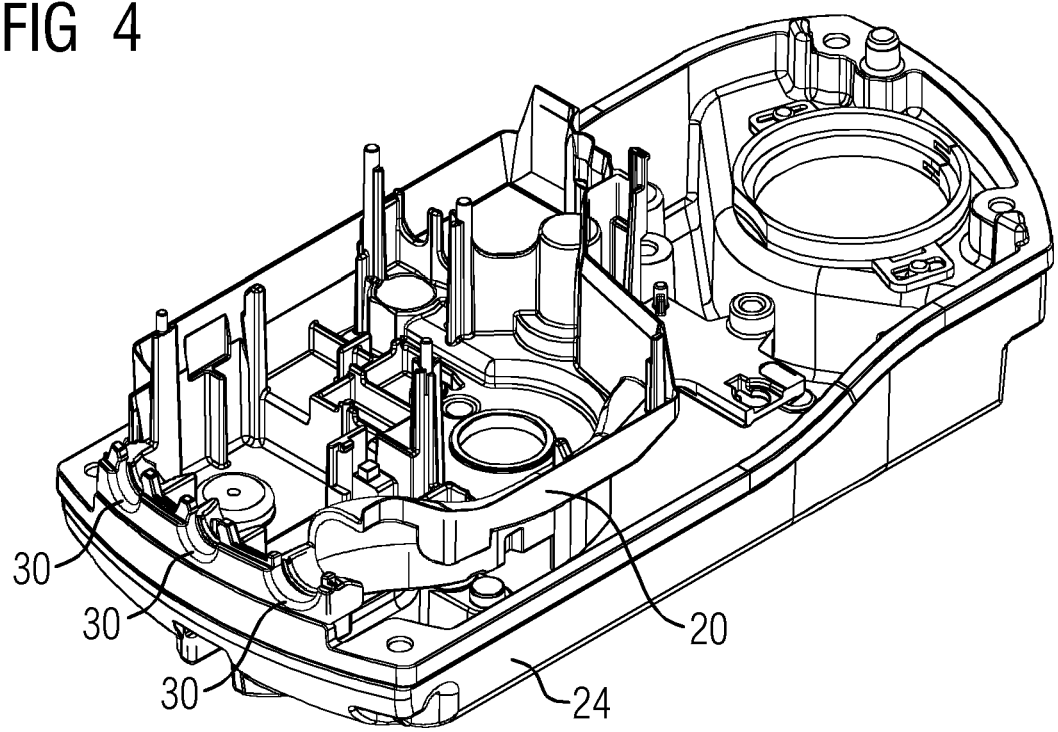

The representation in FIG. 3 initially shows only a section (terminal side) of the lower shell of the outer housing 24. The lower shell of the inner housing 20 is positioned in or on this, and the representation in FIG. 4 shows the lower shell of the outer housing 24 together with the lower shell of the inner housing 20. The lower shell of the inner housing 20 has at least one cable seating profile 30. A semicircular or essentially semicircular recess in an edge of the lower shell of the inner housing 20 turned towards the terminal side functions as a cable seating profile 30. In the exemplary embodiment shown, three cable seating profiles 30 in juxtaposition are provided. With more than one cable seating profile 30 different cable seating profiles 30 can be provided for example for different cable cross-sections.

Figure 5:
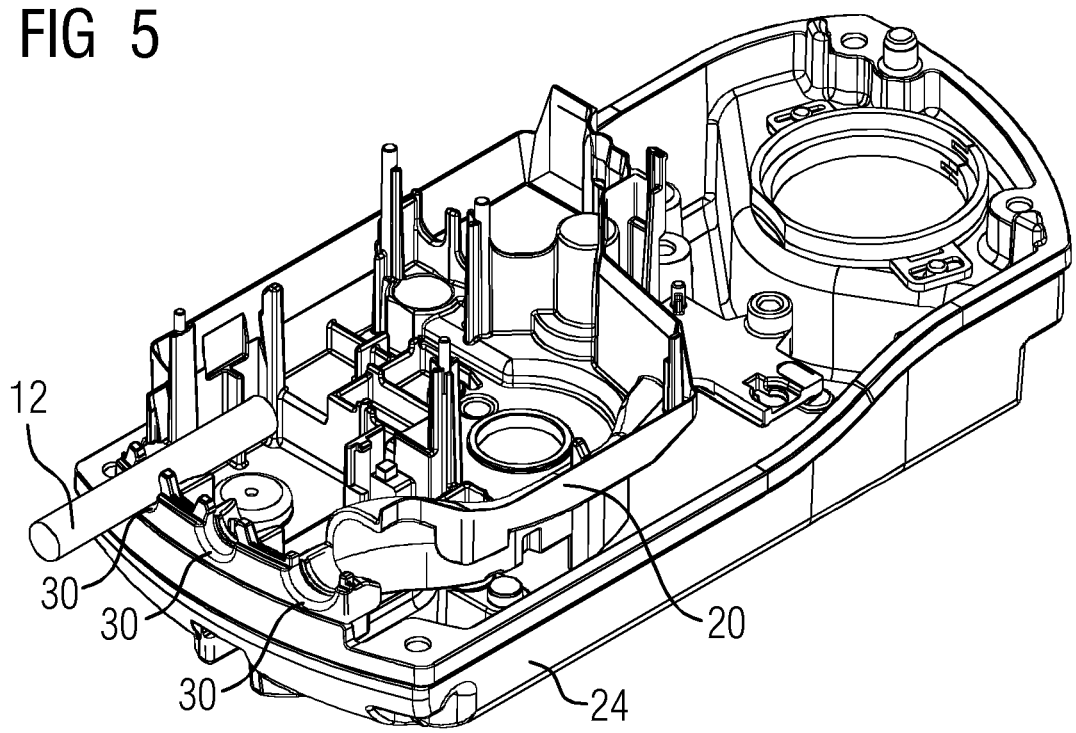

The representation in FIG. 5 shows a snapshot during the laying of a section of a cable 12 in a cable seating profile 30.

Figure 6:
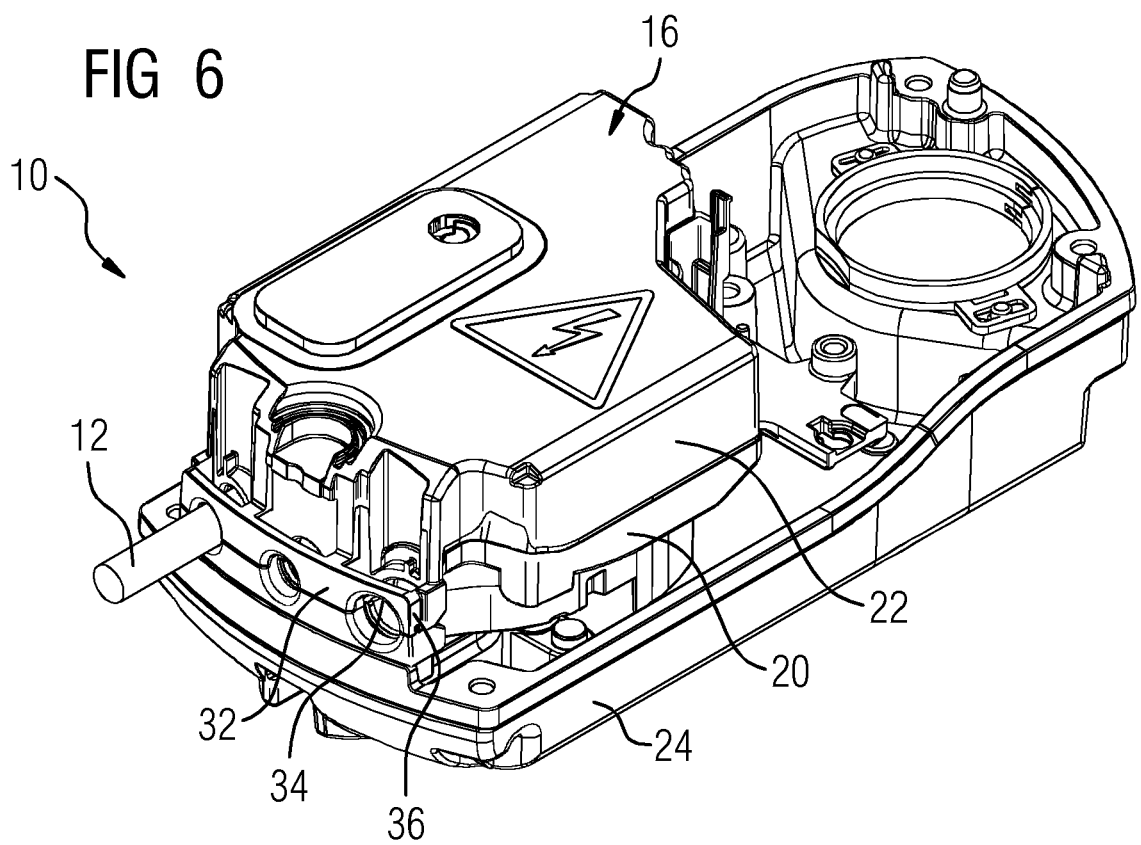

In the representation in FIG. 6 the upper shell of the inner housing 22 is mounted on the lower shell of the inner housing 20. A circuit (not shown in this Figure) determining the function of the device 10 is located in the inner housing 16 thus formed—for example on a pcb. At least individual wires of the cable 12 are connected in a manner in principle known per se to contact pads (not shown) of the circuit. On the terminal side the upper shell of the inner housing 22 has a collar 32, which at least in sections abuts the peripheral surface with the or each cable seating profile 30. Together with the section of the upper shell of the inner housing 22 from which the collar 32 extends, the collar 32 delimits a section on the said peripheral surface of the lower shell of the inner housing 20 (in the same way as a fence surrounding an area of land).

Hereinafter, in the interests of better legibility of the further description, the collar 32 and the section of the upper shell of the inner housing 22 from which this extends, are together designated as a frame 36, as both together delimit a surface section on the edge of the lower shell of the inner housing 20 and together with the edge of the lower shell of the inner housing 20 a volume open on one side (in the representations the "top"). The collar 32 is optionally connected to the upper shell of the inner housing 22 on one level and is for example the result of an injection molding process when manufacturing the upper shell of the inner housing 22.

In the collar 32 and in the section of the upper shell of the inner housing 22 from which this extends, the upper shell of the inner housing 22 optionally—as in the exemplary embodiment shown—has a cable cover profile 34 which is flush with the or each cable seating profile 30. The or each cable cover profile 34 likewise—as in the case of the cable seating profile 30—takes the form of an in particular semicircular recess in the edge of the upper shell of the inner housing 22 facing the terminal side and—flush with this—in the collar 32 of the upper shell of the inner housing 22. After the combination of the upper shell of the inner housing 22 with the lower shell of the inner housing 20 a cable 12 inserted into a cable seating profile 30 of the lower shell of the inner housing 20 is retained by the cable seating profile 30 ("from below") and the cable cover profile 34 ("from above") and is thus already initially fixed, specifically transversely to the longitudinal axis of the cable 12 in this area. Respectively a cable seating profile 30 of the lower shell of the inner housing 20 and a cable cover profile 34 of the upper shell of the inner housing 22 together form a cable insertion opening 30, 34 of the device 10. A cable 12 can also be inserted into such an opening, if the upper shell of the inner housing 22 is already mounted on the lower shell of the inner housing 20. The sequence shown to this extent in the representations in FIG. 5 and FIG. 6 consequently does not represent a mandatory sequence. Rather it is possible for the cable 12 shown in FIG. 6 located in one of the cable insertion openings 30, 34 to have been inserted into the cable insertion opening 30, 34 in the axial direction.

The representation in FIG. 7 shows multiple clamping bodies 38, one of which is inserted into the frame 36 formed with the collar 32. The frame 36 encloses an inserted clamping body 38 in a form-fitted manner or at least essentially in a form-fitted manner. A clamping body 38 inserted into the frame 36 abuts at least with one section the surface of the cable 12 initially fixed by means of the cable seating profile 30 and the cable cover profile 34.

The clamping body 38 optionally has a concave recess (clamping body recess 40) in the area of the cable seating profile 30 or a cable seating profile 30, in particular a recess matching a respective cable cover profile 34. In some embodiments, the clamping body 38 has at least one convex projection (clamping body blanking cover 42) functioning as a blanking cover for one inner housing 16 having multiple cable insertion openings 30, 34. Different clamping bodies 38 with recesses 40 and/or projections 42 at different positions along the greatest longitudinal axis of the clamping body 38 are provided for different connection situations. If in the case of an inner housing 16 with—as in the embodiment represented—three cable insertion openings 30, 34, one cable insertion opening is occupied by a cable 12 and the other two cable insertion openings 30, 34 remain free, a matching clamping body 38 is used, specifically a clamping body 38 with a recess 40 in the area of the used cable insertion openings 30, 34, and projections 42 in the area of the unused cable insertion openings 30, 34. A selection of clamping bodies 38 can be included with a device 10.

The representation in FIG. 8 shows a clamping body 38 inserted into the frame 36. The clamping body 38 is enclosed on four sides by the frame 36. The frame 36 thus retains the clamping body 38 in position. However the clamping body 38 only abuts the surface of the cable 12 and otherwise abuts the section of the edge of the lower shell of the inner housing 20 delimited by the frame 36, in particular with the or each projection 42 on the surface of one cable seating profile 30 in each case.

In the representation in FIG. 8 it is apparent that the clamping body 38 inserted into the frame 36 projects over the edge of the frame 36. For friction-fitted fixing of the or each cable 12 routed to the device 10 through a cable insertion opening 30, 34 the clamping body 38 is compressible. In the compressed state a reduced height of the clamping body 38 ensues, for example a height reduced such that the top edge of the clamping body 38 still protruding over the edge of the frame 36 in the representation in FIG. 8 is flush with the top edge of the frame 36. Such a clamping body 38 may be manufactured from a compressible material, for example a compressible plastic, in particular a thermoplastic elastomer. For the form-fitted fixing of the or each cable 12 routed to the device 10 through the cable insertion opening 30, 34 the clamping body 38 is partially pressed into the or each cable surface. The or each cable 12 is here compressed, for example to such an extent that the top edge of the clamping body 38 still protruding over the edge of the frame 36 in the representation in FIG. 8 is flush with the top edge of the frame 36.

The representation in FIG. 9 shows the device 10 according to FIG. 1 with attached upper shell of the outer housing 26. The upper shell of the outer housing 26 is here screwed to the lower shell of the outer housing 24 for example at the points identified by means of the block arrows. Corresponding screws are shown in the exploded representation in FIG. 2. The lower shell of the outer housing 24 and the upper shell of the outer housing 26 leave free an area with the at least one cable insertion opening 30, 34. To this extent, the parts of the lower shell 20 and upper shell 22 of the inner housing are apparent in the representation in FIG. 9, wherein the visible section of the upper shell of the inner housing 22 is part of the frame 36 retaining the clamping body 38. The clamping body 38 can be seen through the cable insertion openings 30, 34 left free in the situation shown.

The clamping body 38 is pressed against the external surface of the or each cable 12 routed to the device 10 through a cable insertion opening 30, 34 by means of the upper shell of the outer housing 26. For this purpose, the upper shell of the outer housing 26 has a locating surface 44 (FIG. 1).

The representation in FIG. 10 shows the upper shell of the outer housing 26 alone with a direction of view into the interior of the upper shell of the outer housing 26. The locating surface 44 on the edge of the upper shell of the outer housing 26 can be seen here.

Figure 11:
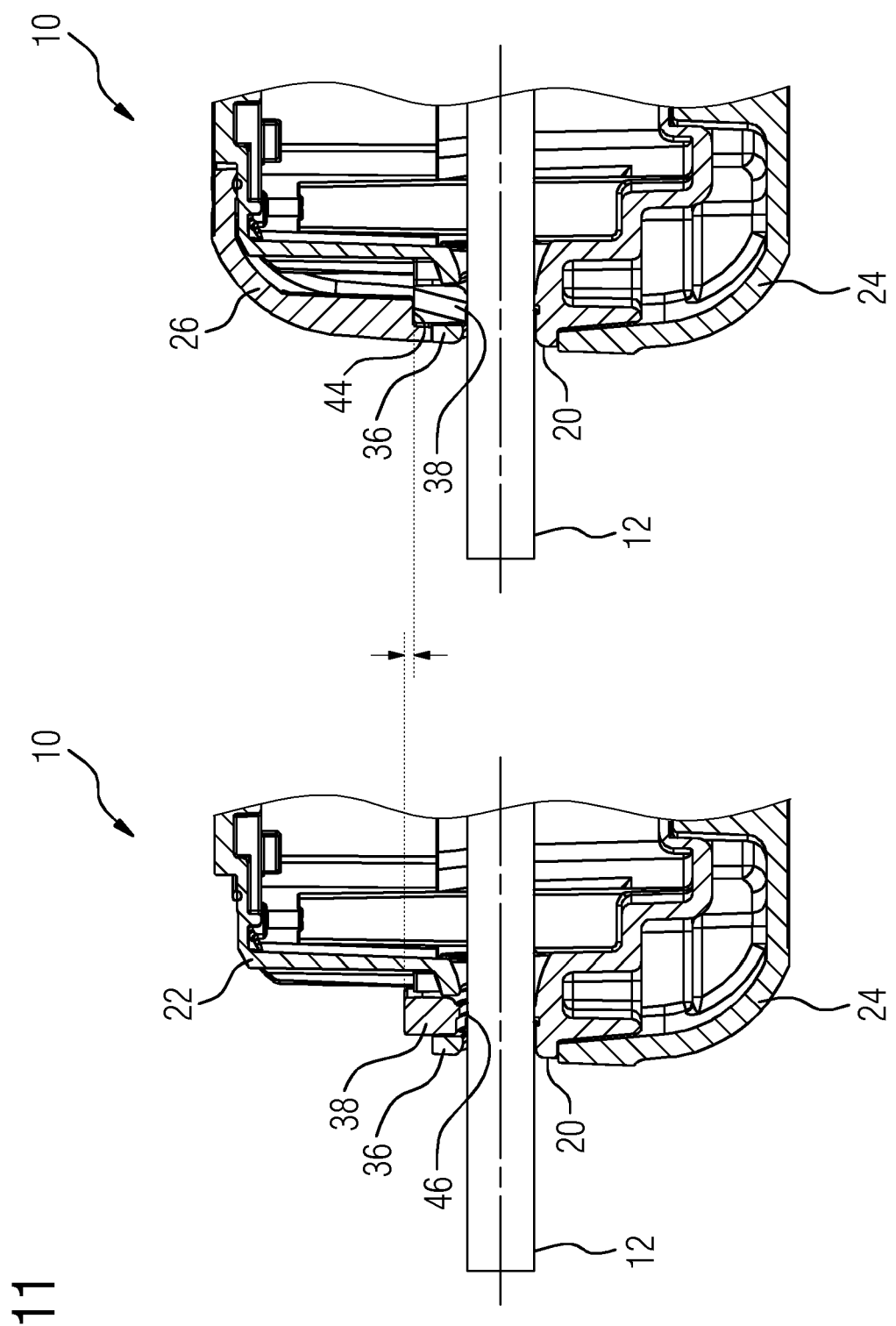
FIG. 11 shows a section through the device housing as shown in FIG. 1 for the configurations shown in FIG. 8 and FIG. 9.

The locating surface 44 can additionally be seen in the representation in FIG. 11. FIG. 11 shows the device 10 in cross-sectional form along the line of intersection A-A shown in FIG. 1, and specifically firstly (left) without the upper shell of the outer housing 26 and secondly (right) with the upper shell of the outer housing 26 mounted. The representation on the left-hand side thus corresponds to the configuration as seen in FIG. 8 and the representation on the right corresponds to the configuration as seen in FIG. 9.

With the upper shell of the outer housing 26 mounted, its locating surface 44 lies on the previously free surface of the clamping body 38. Upon connection of the upper shell of the outer housing 26 to the lower shell of the outer housing 24 the clamping body 38 is compressed and/or a form- and/or friction-fitted profile of the clamping body 38 designated for the sake of brevity as blade 46 pressed into the cable surface and the cable 12 here compressed. This is particularly emphasized in the representation in FIG. 11 through a comparison of the unloaded height of the clamping body 38 (left) with the loaded/compressed height (right). As a result of the loading of the clamping body 38 this presses on the external surface of the or each cable 12 routed to the device 10 through a cable insertion opening 30, 34 in each case. The or each cable 12 is fixed in the axial direction by means of the friction- and/or form-fitting produced in this way. This fixing acts as a strain relief, in such a way that a pulling force exerted outside the device 10 on the cable 12 or a cable 12 does not affect the contact pads in the interior of the device 10.

The retention force effected by means of the friction- and/or form-fitting can be adjusted through a use of clamping bodies 38 of different heights and/or form- and/or friction-fitting profiles 46 of different depths. The height of a clamping body 38 determines how far it projects beyond the edge of the frame 36, and thus by how much this is compressed upon connection of the upper shell of the outer housing 26 to the lower shell of the outer housing 24 and/or how far the cable 12 is compressed by means of the clamping body 38. In the case of a compressible clamping body 38, with the same materials used for the clamping body 38 stronger compression results in a greater retention force. The retention force can of course also be influenced by the choice of the particular material for the clamping body 38.

Although the teachings herein have been illustrated and described in detail by means of the exemplary embodiment, the scope of the disclosure is not limited by that or by the examples disclosed and other variations can be derived herefrom by the person skilled in the art, without departing from the protective scope.

Individual prominent aspects of the description submitted here can thus be summarized in brief as follows: specified first and foremost is a device housing 14, which comprises an inner housing 16 with a lower shell of the inner housing 20 and an upper shell of the inner housing 22 and an outer housing 18 with an lower shell of the outer housing 24 and an upper shell of the outer housing 26, wherein profiles 30, 34 in the lower shell of the inner housing 20 and the upper shell of the inner housing 22 form a cable insertion opening 30, 34 for a cable 12, wherein the inner housing 16 retains a clamping body 38 and by means of the outer housing 18 a friction and/or form-fitted contact between the clamping body 38 and a cable 12 routed to the device 10 can be effected. Also specified are a system with such a device housing 14 and a method for using such a device housing 14.

LIST OF REFERENCE CHARACTERS 10 (Electrical) device
12 Cable
14 Device housing
16 Inner housing
18 Outer housing
20 Lower shell of the inner housing
22 Upper shell of the inner housing
24 Lower shell of the outer housing
26 Upper shell of the outer housing
28 (free)
30 Cable seating profile
32 Collar
34 Cable cover profile
36 Frame
38 Clamping body
40 Clamping body recess
42 Clamping body blanking cover
44 Locating surface
46 Blade, form- and/or friction-fitting profile

What is claimed is:

1. A device housing for an electrical device, the housing comprising:
    an inner housing with a first lower shell and a first upper shell; and
    an outer housing with a second lower shell and a second upper shell;
    a cable insertion opening defined by a cable seating profile in the first lower shell and a flush cable cover profile in the first upper shell for a cable routed to the device;
    a clamping body retained by the inner housing; and
    a friction and/or form-fitting contact between the clamping body and the cable can be effected by means of the outer housing when the clamping body is pressed onto an outer surface of the cable by the upper shell of the outer housing;
    wherein a frame of the first upper shell surrounds an area on an edge of the first lower shell with the cable seating profile; and
    the inner housing retains the clamping body with the frame of the first upper shell and an edge of the first lower shell.

2. The device housing as claimed in claim 1, wherein the frame comprises a collar connected to the first upper shell.

3. The device housing as claimed in claim 1, wherein the frame flush with the cable cover profile of the first upper shell of the inner housing has a corresponding recess belonging to the cable cover profile.

4. The device housing as claimed in claim 1, further comprising a multiplicity of cable insertion openings;
    wherein multiple cables inserted into one cable insertion opening can be individually fixed by exactly one clamping body.

5. The device housing as claimed in claim 1, wherein:
    the clamping body comprises an elastically compressible material;
    the clamping body is compressible by the outer housing; and
    when compressed by the outer housing, the clamping body exerts friction-fitting contact between the clamping body and each cable routed to the device.

6. The device housing as claimed in claim 5, wherein the clamping body is compressed and/or the form- and/or friction-fitting profile of the clamping body is pressed by a locating surface of the upper shell of the outer housing, which upon connection of the upper shell of the outer housing to the lower shell of the outer housing comes into contact with a free surface of the clamping body held in a frame.

7. The device housing as claimed in claim 1, further comprising a form- and/or friction-fitting profile of the clamping body facing the surface of the cable routed to the device;
    wherein the form- and/or friction-fitting profile of the clamping body is pressed into the cable surface by the outer housing creating the form- and/or friction contact between the clamping body and each cable.

8. A system comprising:
    a device housing as claimed in claim 1; and
    a clamping body having a number of clamping body recesses corresponding to a number of cables to be routed to the device and a number of clamping body blanking covers corresponding to a number of cable insertion openings minus a number of cables to be routed to the device.

9. The system as claimed in claim 8, further comprising a multiplicity of clamping bodies each with a respective number of clamping body recesses and clamping body blanking covers and/or clamping body recesses and clamping body blanking covers at different points.

* * * * *